(12) United States Patent
Suzuki (10) Patent No.: US 10,768,351 B2
(45) Date of Patent: Sep. 8, 2020

(54) OPTICAL LAMINATE

(71) Applicant: NITTO DENKO CORPORATION, Ibaraki-shi, Osaka (JP)

(72) Inventor: Mitsuru Suzuki, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 503 days.

(21) Appl. No.: 15/075,571

(22) Filed: Mar. 21, 2016

(65) Prior Publication Data

US 2016/0282533 A1 Sep. 29, 2016

(30) Foreign Application Priority Data

Mar. 27, 2015 (JP) .................................. 2015-066414

(51) Int. Cl.
*G02B 5/30* (2006.01)

(52) U.S. Cl.
CPC ........... *G02B 5/3016* (2013.01); *G02B 5/305* (2013.01); *G02B 5/3083* (2013.01)

(58) Field of Classification Search
CPC ..... G02B 5/3016; G02B 5/3083; G02B 5/305
USPC ........................................................ 349/138
See application file for complete search history.

(56) References Cited

U.S. PATENT DOCUMENTS

| | | | |
|---|---|---|---|
| 5,024,850 A | 6/1991 | Broer et al. | |
| 8,154,694 B2 | 4/2012 | Bitou et al. | |
| 8,722,182 B2 | 5/2014 | Akari et al. | |
| 9,146,417 B2 | 9/2015 | Huh et al. | |
| 9,354,373 B2 | 5/2016 | Goto et al. | |
| 9,720,134 B2 | 8/2017 | Shibata et al. | |
| 2008/0151165 A1 | 6/2008 | Takemoto | |
| 2008/0252973 A1 | 10/2008 | Akari et al. | |
| 2010/0053510 A1* | 3/2010 | Bitou | G02B 5/3083 349/98 |
| 2014/0160406 A1* | 6/2014 | Huh | G02F 1/133528 349/96 |

(Continued)

FOREIGN PATENT DOCUMENTS

| | | |
|---|---|---|
| CN | 101548205 A | 9/2009 |
| CN | 103748487 A | 4/2014 |

(Continued)

OTHER PUBLICATIONS

Office Action dated Dec. 19, 2018, issued in counterpart Japanese application No. 2015-066414, with English translation. (12 pages).

(Continued)

*Primary Examiner* — Charles S Chang
(74) *Attorney, Agent, or Firm* — Westerman, Hattori, Daniels & Adrian, LLP (57) ABSTRACT

Provided is an optical laminate including a resin layer and an adhesive layer, and being excellent in adhesiveness between these layers. The optical laminate includes: a resin layer; an adhesive layer arranged on at least one side of the resin layer; and an intermediate layer formed between the resin layer and the adhesive layer, the intermediate layer containing at least part of a material constituting the resin layer and at least part of a material constituting the adhesive layer, in which the intermediate layer has a thickness of from 20 nm to 200 nm. In one embodiment, the resin layer includes a resin film having optical anisotropy.

6 Claims, 2 Drawing Sheets

(56) References Cited

U.S. PATENT DOCUMENTS

| | | | |
|---|---|---|---|
| 2014/0227482 A1 | 8/2014 | Shibata et al. | |
| 2014/0285887 A1 | 9/2014 | Goto et al. | |
| 2015/0022748 A1* | 1/2015 | Takeda | G02B 5/3016 349/33 |
| 2015/0022764 A1 | 1/2015 | Takeda et al. | |
| 2016/0146996 A1 | 5/2016 | Takeda et al. | |
| 2017/0329050 A1 | 11/2017 | Shibata et al. | |

FOREIGN PATENT DOCUMENTS

| | | | | |
|---|---|---|---|---|
| JP | 2001-188129 A | 7/2001 | | |
| JP | 2006-251773 A | 9/2006 | | |
| JP | 2008-181090 A | 8/2008 | | |
| JP | 2010-133987 A | 6/2010 | | |
| JP | 2012-177017 A | 9/2012 | | |
| JP | 2012-234163 A | 11/2012 | | |
| JP | 2013-133426 A | 7/2013 | | |
| JP | 2013-148883 A | 8/2013 | | |
| JP | 2013-174922 A | 9/2013 | | |
| JP | 2013-235234 A | 11/2013 | | |
| JP | 2014-145852 A | 8/2014 | | |
| JP | 2014-191028 A | 10/2014 | | |
| JP | 2014-232126 A | 12/2014 | | |
| JP | WO 2015012014 | * | 1/2015 | ............. C08K 5/103 |
| KR | 10-2008-0060178 A | 7/2008 | | |
| TW | 201403144 A | 1/2014 | | |
| TW | 201508351 A | 3/2015 | | |
| WO | 2008/111580 A1 | 9/2008 | | |
| WO | 2015/012014 A1 | 1/2015 | | |
| WO | WO 2015012014 | * | 1/2015 | ............. C08K 5/103 349/96 |

OTHER PUBLICATIONS

Office Action dated Jan. 2, 2019, issued in counterpart CN Application No. 201610178105.5, with English translation (20 pages).

Office Action dated Aug. 27, 2019, issued in counterpart Japanese Application No. 2015-066414 (w/ English translation; 8 pages).

Office Action dated Oct. 15, 2019, issued in counterpart Taiwanese Application No. 105109064 (w/ English translation; 9 pages).

Third Party Submission, dated Jan. 29, 2020, submitted in counterpart Japanese Patent Application No. 2015-66414 (w/ English translation; 39 pages).

* cited by examiner

OPTICAL LAMINATE

This application claims priority under 35 U.S.C. Section 119 to Japanese Patent Application No. 2015-066414 filed on Mar. 27, 2015, which is herein incorporated by references.

BACKGROUND OF THE INVENTION

1. Field of the Invention

The present invention relates to an optical laminate.

2. Description of the Related Art

In recent years, the thinning of an image display apparatus typified by a liquid crystal display apparatus or an organic EL display apparatus has been progressing, and the thinning of a member to be used in the image display apparatus has been required in association with the thinning.

A member including a laminate of various optical films has been generally used as the member to be used in the image display apparatus. An adhesive (e.g., a photocurable adhesive) may be used in the bonding of the optical films as one method of thinning such member. However, the adhesive does not necessarily express sufficient adhesiveness in the adhesion of the optical films, and is responsible for unnecessary interlayer peeling. In particular, when an optical laminate is produced through a peeling step (e.g., the peeling of a base material to be performed upon transfer of a layer formed on the base material), the following problem is liable to occur. Peeling occurs at an undesired site owing to the insufficient adhesiveness of the adhesive.

SUMMARY OF THE INVENTION

The present invention has been made to solve the problems of the related-art described above, and a primary object of the present invention is to provide an optical laminate including a resin layer and an adhesive layer, and being excellent in adhesiveness between these layers.

According to one embodiment of the present invention, there is provided an optical laminate, including: a resin layer; an adhesive layer arranged on at least one side of the resin layer; and an intermediate layer formed between the resin layer and the adhesive layer, the intermediate layer containing at least part of a material constituting the resin layer and at least part of a material constituting the adhesive layer, in which the intermediate layer has a thickness of from 20 nm to 200 nm.

In one embodiment, the resin layer includes a resin film having optical anisotropy.

In one embodiment, the resin layer includes one of a cycloolefin-based resin film, a polycarbonate-based resin film, a cellulose-based resin film, and a (meth)acrylic resin film.

In one embodiment, the optical laminate further includes an optical functional layer arranged on a side of the adhesive layer opposite to the resin layer, in which the optical functional layer includes one of a solidified layer of a liquid crystal material and a cured layer thereof.

In one embodiment, the optical functional layer is formed by transfer.

According to another embodiment of the present invention, there is provided a circularly polarizing plate. The circularly polarizing plate includes the optical laminate.

According to yet another embodiment of the present invention, there is provided a method of producing the optical laminate. The production method includes: applying a composition for forming an adhesive layer containing a curable adhesive onto a resin film to form an applied layer; and curing the applied layer, a time period from an end of the formation of the applied layer to initiation of curing treatment being from 10 seconds to 250 seconds.

According to the embodiment of the present invention, the optical laminate including a resin layer and an adhesive layer, and being excellent in adhesiveness between the resin layer and the adhesive layer because an intermediate layer having a specific thickness is formed between the resin layer and the adhesive layer can be provided.

DETAILED DESCRIPTION OF THE PREFERRED EMBODIMENTS

Now, embodiments of the present invention are described. However, the present invention is not limited to these embodiments.

Definitions of Terms and Symbols

The definitions of terms and symbols used herein are as described below.

(1) Refractive Indices ($n_x$, $n_y$, and $n_z$)

"$n_x$" represents a refractive index in a direction in which an in-plane refractive index is maximum (that is, slow axis direction), "$n_y$" represents a refractive index in a direction perpendicular to the slow axis in the plane (that is, fast axis direction), and "$n_z$" represents a refractive index in a thickness direction.

(2) In-Plane Retardation (Re)

"$Re(\lambda)$" refers to an in-plane retardation measured at 23° C. with light having a wavelength of $\lambda$ nm. For example, "Re(550)" refers to an in-plane retardation measured at 23° C. with light having a wavelength of 550 nm. The $Re(\lambda)$ is determined from the equation "$Re(\lambda)=(n_x-n_y)\times d$" when the thickness of a layer (film) is represented by d (nm).

(3) Thickness Direction Retardation (Rth)

"$Rth(\lambda)$" refers to a thickness direction retardation measured at 23° C. with light having a wavelength of $\lambda$ nm. For example, "Rth(550)" refers to a thickness direction retardation measured at 23° C. with light having a wavelength of 550 nm. The $Rth(\lambda)$ is determined from the equation "$Rth(\lambda)=(n_x-n_z)\times d$" when the thickness of a layer (film) is represented by d (nm).

(4) Nz Coefficient

An Nz coefficient is determined from the equation "$Nz=Rth/Re$".

(5) Birefringent Index ($\Delta n_{xy}$)

A birefringent index $\Delta n_{xy}$ is determined from the equation "$\Delta n_{xy}=n_x-n_y$".

A. Entire Construction of Optical Laminate

Figure 1:
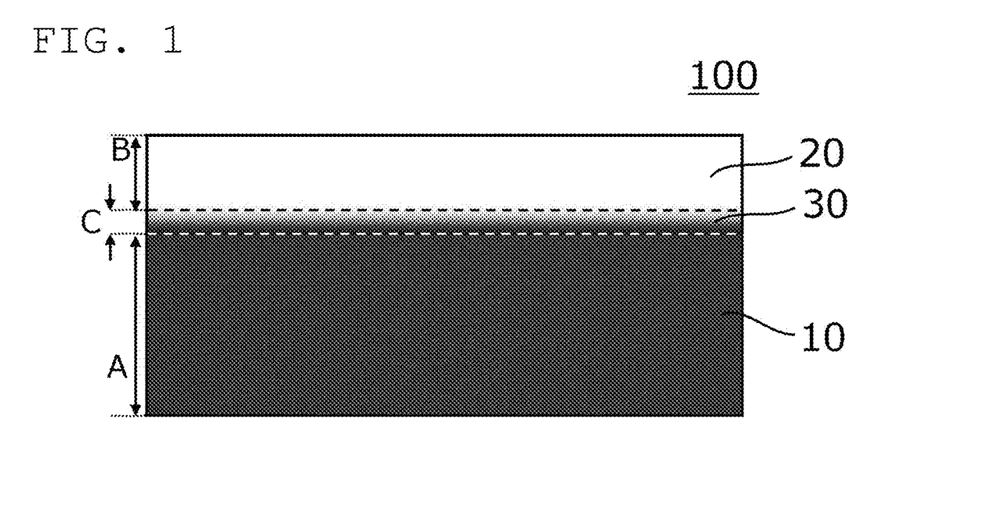
FIG. 1 is a schematic sectional view of an optical laminate according to one embodiment of the present invention.

FIG. 1 is a schematic sectional view of an optical laminate according to one embodiment of the present invention. An optical laminate 100 of this embodiment includes a resin layer 10 and an adhesive layer 20 arranged on at least one side of the resin layer 10, and an intermediate layer 30 is formed between the resin layer 10 and the adhesive layer 20.

The resin layer 10 typically includes a resin film. The adhesive layer 20 is typically formed by applying a composition for forming an adhesive layer onto the resin film. The intermediate layer 30 is typically formed by the permeation of the composition for forming an adhesive layer into the resin film. When the adhesive layer 20 is formed by applying the composition for forming an adhesive layer onto the resin film, a material constituting the resin film may be eluted into the composition for forming an adhesive layer. A portion formed by the elution of the material constituting the resin film as described above also corresponds to the intermediate layer 30. That is, the intermediate layer 30 contains at least part of a material constituting the resin layer 10 and at least part of a material constituting the adhesive layer 20. The intermediate layer may be a layer formed by the compatibilization of the material constituting the resin layer 10 and the material constituting the adhesive layer 20. In addition, the intermediate layer 30 is a layer in contact with both the resin layer 10 and the adhesive layer 20. It should be noted that in FIG. 1, in consideration of a method of forming the adhesive layer, the adhesive layer is illustrated so as to be on an upper side.

The thickness of the intermediate layer (a thickness C in FIG. 1) is from 20 nm to 200 nm, preferably from 30 nm to 180 nm, more preferably from 30 nm to 150 nm. It should be noted that the thickness of the intermediate layer can be measured by: observing a section of the optical laminate with a microscope (e.g., a TEM); and identifying an interface between the intermediate layer and each of the resin layer and the adhesive layer. A predetermined analysis method (e.g., time-of-flight secondary ion mass spectrometry) may be used in the identification of the interface.

In the present invention, an optical laminate excellent in adhesiveness between the resin layer and the adhesive layer can be obtained by forming the intermediate layer between the resin layer and the adhesive layer. Such optical laminate is excellent in, for example, productivity upon lamination of a predetermined film on the adhesive layer by transfer. More specifically, when a film formed on another base material is laminated on the adhesive layer and then an attempt is made to peel the base material, peeling at an undesired site (e.g., a space between the resin layer and the adhesive layer, or the inside of the adhesive layer) is prevented, and hence only the base material can be peeled. Setting the thickness of the intermediate layer within the range makes such effect significant. It should be noted that when the thickness of the intermediate layer is less than 20 nm, an improving effect on the adhesiveness by the formation of the intermediate layer may not be sufficient. In addition, in an optical laminate including an intermediate layer having a thickness of more than 200 nm, the following state may be established: the adhesive function of the adhesive layer itself is impaired. Accordingly, the adhesiveness between the resin layer and the adhesive layer may reduce. It should be noted that the thickness of the intermediate layer can be adjusted by: a combination of the resin film forming the resin layer and a curable adhesive constituting the adhesive layer; a time period from the end of the application of the curable adhesive onto the resin film to the initiation of the curing of the applied layer; and the like.

The thickness of the intermediate layer is preferably from 2% to 20%, more preferably from 3% to 18% of the thickness of the adhesive layer. When the thickness falls within such range, the effect becomes significant.

The thickness of the resin layer (a thickness A in FIG. 1) is preferably 70 μm or less, more preferably from 10 μm to 60 μm.

The thickness of the adhesive layer (a thickness B in FIG. 1) is preferably from 0.5 μm to 2 μm, more preferably from 0.6 μm to 1.5 μm. The use of the curable adhesive can reduce the thickness of the adhesive layer.

In the optical laminate, the peel strength of the resin layer with respect to the adhesive layer is preferably more than 6 N, more preferably 7 N or more, still more preferably 8 N or more, particularly preferably 10 N or more. Herein, the peel strength means a 90° peel strength at a measurement temperature of 23° C. and a tension speed of 3,000 mm/min.

The optical laminate of the present invention may further include another layer. Examples of the other layer include an optical functional layer, a polarizer, and a protective layer configured to protect the polarizer. In addition, the construction (function, material, characteristics, and the like) of the resin layer, which is not particularly limited, can be preferably selected as appropriate in accordance with, for example, the layer construction of the optical laminate and the applications of the optical laminate specified by the layer construction.

Figure 2:
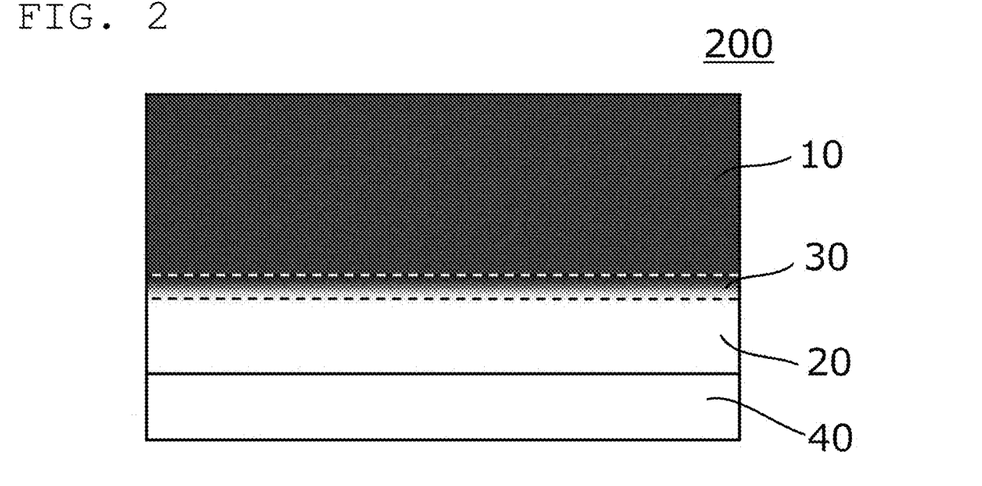
FIG. 2 is a schematic sectional view of an optical laminate according to another embodiment of the present invention.

As illustrated in FIG. 2, the optical functional layer can be bonded to the resin layer through intermediation of the adhesive layer. An optical laminate 200 of an embodiment illustrated in FIG. 2 includes an optical functional layer 40, the adhesive layer 20, and the resin layer 10 in the stated order, and the intermediate layer 30 is formed between the adhesive layer 20 and the resin layer 10. It should be noted that in FIG. 2 (and FIG. 3 to be described below), in consideration of a preferred use mode of the optical laminate, the optical laminate is illustrated so that a viewer side when the laminate is applied to an image display apparatus may be on an upper side.

Figure 3:
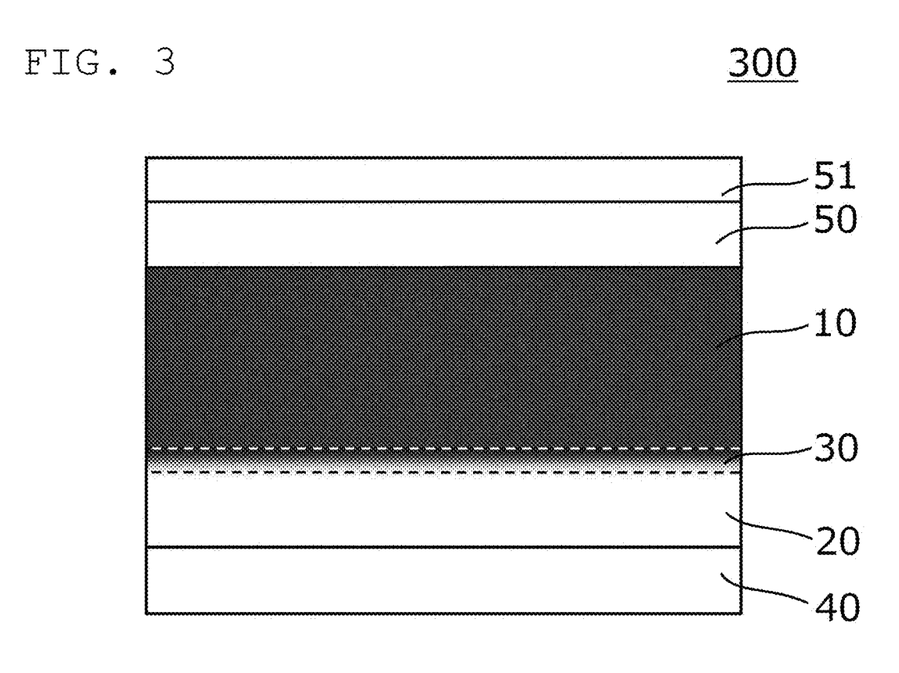
FIG. 3 is a schematic sectional view of an optical laminate according to yet another embodiment of the present invention.

A more specific example of an embodiment concerning the layer construction of the optical laminate of the present invention and the applications of the optical laminate specified by the layer construction is illustrated in FIG. 3. An optical laminate 300 of this embodiment includes the adhesive layer 20, the resin layer 10, and a polarizer 50 in the stated order, and the intermediate layer 30 is formed between the adhesive layer 20 and the resin layer 10. The optical laminate 300 may include the optical functional layer 40 on the side of the adhesive layer 20 opposite to the resin layer 10 like the illustrated example. A protective layer can be arranged on one side, or each of both sides, of the polarizer 50. FIG. 3 is an illustration of the embodiment in which the resin layer 10 functions as the protective layer on one side of the polarizer 50 and a protective layer 51 is arranged on the other side thereof. Although not illustrated, another layer serving as the protective layer may be arranged between the polarizer and the resin layer.

The optical laminate of the embodiment illustrated in FIG. 3 is, for example, an optical laminate including the resin layer 10 capable of functioning as a λ/4 plate. Combining the polarizer and the resin layer capable of functioning as a λ/4 plate can provide an optical laminate functioning as a circularly polarizing plate. In this case, an angle θ formed between the slow axis of the resin layer and the absorption axis of the polarizer is preferably from 38° to 52°, more preferably from 42° to 48°, still more preferably about 45°. For example, a solidified layer or cured layer (described later) of a liquid crystal material can be adopted as the optical functional layer. It should be noted that the resin layer 10 capable of functioning as a λ/4 plate can function as a protective layer (inner protective layer) for the polarizer 50 as well.

B. Resin Layer

The resin layer may be formed from any appropriate resin film as long as the effects of the present invention are obtained. As a constituent resin for the resin film, there are given, for example, a cellulose-based resin, a cycloolefin-based resin, a (meth)acrylic resin, a polycarbonate-based resin, a polyester-based resin, a polyvinyl alcohol-based resin, a polyamide-based resin, a polyimide-based resin, a polyether-based resin, and a polystyrene-based resin. Of those, a cycloolefin-based resin, a polycarbonate-based resin, a cellulose-based resin, or a (meth)acrylic resin is preferred. The intermediate layer can be formed with a satisfactory thickness when a resin film formed of a cycloolefin-based resin, a polycarbonate-based resin, a cellulose-based resin, or a (meth)acrylic resin is used.

As described above, the construction (function, material, characteristics, and the like) of the resin layer can be appropriately selected in accordance with, for example, the layer construction of the optical laminate and the applications of the optical laminate specified by the layer construction. The construction of the resin layer is described below by taking a resin layer having optical anisotropy and a resin layer capable of functioning as a protective layer for a polarizer as typical examples thereof.

(Resin Layer Having Optical Anisotropy)

The resin layer preferably has optical anisotropy and its refractive index characteristic more preferably shows a relationship of $nx>ny \geq nz$. In one embodiment, the resin layer can function as a $\lambda/4$ plate. In this case, the $\lambda/4$ plate serving as a retardation layer has an in-plane retardation Re(550) of preferably from 80 nm to 200 nm, more preferably from 100 nm to 180 nm, still more preferably from 110 nm to 170 nm. It should be noted that the expression "ny=nz" as used herein includes not only the case where the ny and the nz are completely identical to each other but also the case where the ny and the nz are substantially equal to each other. Therefore, the ny may be smaller than the nz to the extent that the effects of the present invention are not impaired.

A resin film capable of forming the resin layer having optical anisotropy is, for example, a cycloolefin-based resin film, a polycarbonate-based resin film, or a cellulose-based resin film. Of those, a cycloolefin-based resin film or a polycarbonate-based resin film is preferred. Those resin films are each suitable as a material for the resin layer capable of functioning as a $\lambda/4$ plate.

The cycloolefin-based resin is a generic name for resins each polymerized by using a cycloolefin as a polymerization unit, and examples thereof include resins disclosed in Japanese Patent Application Laid-open No. Hei 1-240517, Japanese Patent Application Laid-open No. Hei 3-14882, Japanese Patent Application Laid-open No. Hei 3-122137, and the like. Specific examples thereof include a ring-opened (co)polymer of a cycloolefin, a polymer obtained by the addition polymerization of a cycloolefin, a copolymer (typically a random copolymer) of a cycloolefin and an α-olefin, such as ethylene or propylene, a graft-modified polymer obtained by modifying the polymer with an unsaturated carboxylic acid or a derivative thereof, and a hydrogenated product thereof. A specific example of the cycloolefin is a norborene-based monomer. Examples of the norbornene-based monomer include: norbornene, alkyl- and/or alkylidene-substituted products thereof, such as 5-methyl-2-norbornene, 5-dimethyl-2-norbornene, 5-ethyl-2-norbornene, 5-butyl-2-norbornene, and 5-ethylidene-2-norbornene, and polar group-(such as halogen-) substituted products thereof; dicyclopentadiene and 2,3-dihydrodicyclopentadiene; dimethanooctahydronaphthalene, alkyl- and/or alkylidene-substituted products thereof, and polar group-(such as halogen-) substituted products thereof, such as 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, and 6-methoxycarbonyl-1,4:5,8-dimethano-1,4,4a,5,6,7,8,8a-octahydronaphthalene; a trimer and a tetramer of cyclopentadiene, such as 4,9:5,8-dimethano-3a,4,4a,5,8,8a,9,9a-octahydro-1H-benzoindene and 4,11:5,10:6,9-trimethano-3a,4,4a,5,5a,6,9,9a,10,10a,11,11a-dodecahydro-1H-cyclopentaanthracene.

In the present invention, any other cycloolefin that may be subjected to ring-opening polymerization may be used in combination with the cycloolefin to the extent that the object of the present invention is not impaired. Specific examples of such cycloolefin include compounds each having one reactive double bond, such as cyclopentene, cyclooctene, and 5,6-dihydrodicyclopentadiene.

The number-average molecular weight (Mn) of the cycloolefin-based resin, which is measured by a gel permeation chromatograph (GPC) method with a toluene solvent, is preferably from 25,000 to 200,000, more preferably from 30,000 to 100,000, most preferably from 40,000 to 80,000. When the number-average molecular weight falls within the range, a resin film excellent in mechanical strength, and excellent in solubility, formability, and flow-casting operability can be obtained.

When the cycloolefin-based resin is obtained by hydrogenating a ring-opened polymer of a norbornene-based monomer, a hydrogenation rate is preferably 90% or more, more preferably 95% or more, most preferably 99% or more. When the hydrogenation rate falls within such range, the resin is excellent in, for example, heat deterioration resistance and light deterioration resistance.

Any appropriate polycarbonate-based resin is used as the polycarbonate-based resin. For example, a polycarbonate-based resin containing a structural unit derived from a dihydroxy compound is preferred. The dihydroxy compound is, for example, a dihydroxy compound represented by the following general formula (1).

(In the general formula (1), $R_1$ to $R_4$ each independently represent a hydrogen atom, a substituted or unsubstituted alkyl group having 1 to 20 carbon atoms, a substituted or unsubstituted cycloalkyl group having 6 to 20 carbon atoms, or a substituted or unsubstituted aryl group having 6 to 20 carbon atoms, X represents a substituted or unsubstituted alkylene group having 2 to 10 carbon atoms, a substituted or unsubstituted cycloalkylene group having 6 to 20 carbon atoms, or a substituted or unsubstituted arylene group having 6 to 20 carbon atoms, and m and n each independently represent an integer of from 0 to 5.)

Specific examples of the dihydroxy compound represented by the general formula (1) include 9,9-bis(4-hydroxyphenyl)fluorene, 9,9-bis(4-hydroxy-3-methylphenyl)fluorene, 9,9-bis(4-hydroxy-3-ethylphenyl)fluorene, 9,9-bis(4-hydroxy-3-n-propylphenyl)fluorene, 9,9-bis(4-hydroxy-3-isopropylphenyl)fluorene, 9,9-bis(4-hydroxy-3-n-butylphenyl)fluorene, 9,9-bis(4-hydroxy-3-sec-butylphenyl)fluorene, 9,9-bis(4-hydroxy-3-tert-butylphenyl)fluorene, 9,9-bis(4-hydroxy-3-cyclohexylphenyl)fluorene, 9,9-bis(4-hydroxy-3-phenylphenyl)fluorene, 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, and 9,9-bis(4-(3-hydroxy-2,2-dimethylpropoxy)phenyl)fluorene.

The polycarbonate-based resin may contain a structural unit derived from the dihydroxy compound and a structural unit derived from a dihydroxy compound, such as isosorbide, isomannide, isoidide, spiroglycol, dioxane glycol, diethylene glycol (DEG), triethylene glycol (TEG), polyethylene glycol (PEG), or a bisphenol.

The polycarbonate-based resin as described above is disclosed in, for example, Japanese Patent No. 5204200, Japanese Patent Application Laid-open No. 2012-67300, Japanese Patent No. 3325560, and International Patent WO2014/06167A in detail. The disclosures of the patent literatures are incorporated herein by reference.

The glass transition temperature of the polycarbonate-based resin is preferably from 110° C. to 150° C., more preferably from 120° C. to 140° C. When the glass transition temperature is excessively low, the heat resistance of the resin tends to deteriorate and hence the resin may cause a dimensional change after its forming into a film. When the glass transition temperature is excessively high, the forming stability of the resin at the time of its forming into a film may deteriorate. In addition, the transparency of the film may be impaired. It should be noted that the glass transition temperature is determined in conformity with JIS K 7121 (1987).

Any appropriate cellulose-based resin may be adopted as the cellulose-based resin to the extent that the effects of the present invention are not impaired. Examples thereof include triacetylcellulose (TAC) and diacetylcellulose. In addition, a cellulose ester-based resin, such as cellulose (di, tri)acetate, cellulose propionate, cellulose butyrate, cellulose acetate propionate, cellulose acetate butyrate, cellulose acetate phthalate, or cellulose phthalate, may also be used.

The resin film may be obtained by any appropriate method. For example, the resin film can be obtained by stretching an unstretched resin film.

Any appropriate stretching method and stretching conditions (such as a stretching temperature, a stretching ratio, and a stretching direction) may be adopted for the stretching. Specifically, one kind of various stretching methods, such as free-end stretching, fixed-end stretching, free-end shrinkage, and fixed-end shrinkage, can be employed alone, or two or more kinds thereof can be employed simultaneously or sequentially. With regard to the stretching direction, the stretching can be performed in various directions or dimensions, such as a lengthwise direction, a widthwise direction, a thickness direction, and an oblique direction. When the glass transition temperature of the resin film is represented by Tg, the stretching temperature falls within a range of preferably from Tg−30° C. to Tg+60° C., more preferably from Tg−10° C. to Tg+50° C.

A resin film having the desired optical characteristics (such as a refractive index characteristic, an in-plane retardation, and an Nz coefficient) can be obtained by appropriately selecting the stretching method and stretching conditions.

In one embodiment, the resin film is produced by subjecting an unstretched resin film to uniaxial stretching or fixed-end uniaxial stretching. The fixed-end uniaxial stretching is specifically, for example, a method involving stretching the resin film in its widthwise direction (lateral direction) while running the film in its lengthwise direction. The stretching ratio is preferably from 1.1 times to 3.5 times.

The resin layer having optical anisotropy has a birefringent index $\Delta n_{xy}$ of preferably 0.0025 or more, more preferably 0.0028 or more. Meanwhile, an upper limit for the birefringent index $\Delta n_{xy}$ is, for example, 0.0060, preferably 0.0050. Optimizing the birefringent index within such range leads to the formation of a thin resin layer having desired optical characteristics.

The Nz coefficient of the resin layer having optical anisotropy is preferably from 0.9 to 3, more preferably from 0.9 to 2.5, still more preferably from 0.9 to 1.5, particularly preferably from 0.9 to 1.3.

The resin layer having optical anisotropy may show such a reverse wavelength dispersion characteristic that its retardation value increases with the wavelength of measuring light, may show such a positive wavelength dispersion characteristic that the retardation value reduces with the wavelength of the measuring light, or may show such a flat wavelength dispersion characteristic that the retardation value is substantially free from changing with the wavelength of the measuring light. In one embodiment, the resin layer shows the reverse wavelength dispersion characteristic. In this case, the resin layer has a ratio "Re(450)/Re(550)" of preferably 0.8 or more and less than 1, more preferably 0.8 or more and 0.95 or less. With such construction, an extremely excellent antireflection characteristic can be realized. The polycarbonate-based resin film is preferably used as a material constituting the resin layer showing the reverse wavelength dispersion characteristic. In addition, the cellulose-based resin film may be used. In another embodiment, the resin layer shows the flat wavelength dispersion characteristic. In this case, the resin layer preferably has a ratio "Re(450)/Re(550)" of from 0.99 to 1.03, and preferably has a ratio "Re(650)/Re(550)" of from 0.98 to 1.02. It should be noted that the resin layer showing the flat wavelength dispersion characteristic can be formed by using, for example, the cycloolefin-based resin film. In addition, the resin layer showing the flat wavelength dispersion characteristic can have a laminated structure. Specifically, the resin layer can be formed by arranging a retardation film functioning as a $\lambda/2$ plate and a retardation film functioning as a $\lambda/4$ plate at a predetermined axial angle (e.g., from 50° to 70°, preferably about 60°).

(Resin Layer Capable of Functioning as Protective Layer for Polarizer)

As described above, the resin layer can function as a protective layer (inner protective layer) for a polarizer in an optical laminate including the polarizer. In one embodiment, the resin layer capable of functioning as the protective layer can be formed from a (meth)acrylic resin film or the cellulose-based resin film.

Any appropriate (meth)acrylic resin may be adopted as the (meth)acrylic resin as long as the effects of the present invention are not impaired. Examples thereof include poly (meth)acrylates, such as poly(methyl methacrylate), a methyl methacrylate-(meth)acrylic acid copolymer, a methyl methacrylate-(meth)acrylate copolymer, a methyl methacrylate-acrylate-(meth)acrylic acid copolymer, a methyl (meth)acrylate-styrene copolymer (such as an MS resin), and a polymer having an alicyclic hydrocarbon group (such as a methyl metharylate-cyclohexyl methacrylate copolymer or a methyl methacrylate-norbornyl (meth)acrylate copolymer). Preferred examples thereof include poly ($C_{1-6}$ alkyl (meth)acrylates), such as polymethyl (meth) acrylate. A more preferred example thereof is a methyl methacrylate-based resin containing methyl methacrylate as a main component (from 50 wt % to 100 wt %, preferably from 70 wt % to 100 wt %).

The (meth)acrylic resin is particularly preferably a (meth) acrylic resin having a lactone ring structure because of having high heat resistance, high transparency, and high mechanical strength. Examples of the (meth)acrylic resin having a lactone ring structure include (meth)acrylic resins each having a lactone ring structure disclosed in Japanese Patent Application Laid-open No. 2000-230016, Japanese Patent Application Laid-open No. 2001-151814, Japanese Patent Application Laid-open No. 2002-120326, Japanese Patent Application Laid-open No. 2002-254544, and Japanese Patent Application Laid-open No. 2005-146084.

The mass-average molecular weight (sometimes referred to as weight-average molecular weight) of the (meth)acrylic resin is preferably from 1,000 to 2,000,000, more preferably from 5,000 to 1,000,000, still more preferably from 10,000 to 500,000, particularly preferably from 50,000 to 500,000.

The glass transition temperature of the (meth)acrylic resin is preferably 115° C. or more, more preferably 120° C. or more, still more preferably 125° C. or more, particularly preferably 130° C. or more because excellent durability can be obtained. An upper limit value for the glass transition temperature of the (meth)acrylic resin is not particularly limited, but is preferably 170° C. or less from the viewpoint of formability or the like.

As described in the section A, the resin layer having optical anisotropy may also serve as the protective layer (inner protective layer) for the polarizer.

C. Adhesive Layer

The adhesive layer is formed from any appropriate adhesive as long as the effects of the present invention are obtained. It should be noted that the state of the adhesive irreversibly changes from a liquid to a solid in the course of the formation of the adhesive layer, and the adhesive has flowability at the time of its application and has such a property as to be cured by curing treatment (e.g., irradiation with an active energy ray or heating). A curable adhesive is preferably used as the adhesive, and a UV-curable adhesive is more preferably used.

The UV-curable adhesive contains, as a curable monomer, a curable monomer such as a compound having a (meth) acryloyl group or a compound having a vinyl group. The compound having a (meth)acryloyl group is preferably used.

Examples of the compound having a (meth)acryloyl group include: (meth)acrylic acid alkyl esters each having a linear or branched alkyl group having 1 to 20 carbon atoms; cycloalkyl (meth)acrylates, such as cyclohexyl (meth)acrylate and cyclopentyl (meth)acrylate; aralkyl (meth)acrylates, such as benzyl (meth)acrylate; polycyclic (meth)acrylates, such as 2-isobornyl (meth)acrylate, 2-norbornylmethyl (meth)acrylate, 5-norbornen-2-yl-methyl (meth)acrylate, and 3-methyl-2-norbornylmethyl (meth)acrylate; hydroxy group-containing (meth)acrylic acid esters, such as hydroxyethyl (meth)acrylate, 2-hydroxypropyl (meth)acrylate, and 2,3-dihydroxypropylmethyl-butyl (meth)acrylate; alkoxy group- or phenoxy group-containing (meth)acrylic acid esters, such as 2-methoxyethyl (meth)acrylate, 2-ethoxyethyl (meth)acrylate, 2-methoxymethoxyethyl (meth)acrylate, 3-methoxybutyl (meth)acrylate, ethylcarbitol (meth) acrylate, and phenoxyethyl (meth)acrylate; epoxy group-containing (meth)acrylic acid esters, such as glycidyl (meth) acrylate; halogen-containing (meth)acrylic acid esters, such as 2,2,2-trifluoroethyl (meth)acrylate, 2,2,2-trifluoroethyl-ethyl (meth)acrylate, tetrafluoropropyl (meth)acrylate, hexafluoropropyl(meth)acrylate, octafluoropentyl (meth) acrylate, and heptadecafluorodecyl (meth)acrylate; and alkylaminoalkyl (meth)acrylates, such as dimethylaminoethyl (meth)acrylate. In addition, for example, the following compound may also be used as the compound having a (meth)acryloyl group: an amide group-containing monomer, such as hydroxyethylacrylamide, N-methylolacrylamide, N-methoxymethylacrylamide, N-ethoxymethylacrylamide, or (meth)acrylamide; a nitrogen-containing monomer, such as acryloylmorpholine; or a polyethylene glycol diacrylate, such as polyethylene glycol #200 diacrylate, polyethylene glycol #400 diacrylate, or polyethylene glycol #600 diacrylate. The compounds each having a (meth)acryloyl group may be used alone or in combination.

In one embodiment, the adhesive preferably contains a curable monomer having a SP value of from 7 $(cal/cm^3)^{1/2}$ to 13 $(cal/cm^3)^{1/2}$, and more preferably contains a curable monomer having a SP value of from 8 $(cal/cm^3)^{1/2}$ to 12 $(cal/cm^3)^{1/2}$. The use of the adhesive containing such curable monomer can provide an optical laminate in which the thickness of the intermediate layer is appropriately adjusted, and the adhesiveness between the resin layer and the adhesive layer is significantly excellent. In addition, the use of the adhesive for the resin layer including the polycarbonate-based resin makes such effect additionally significant. Examples of the curable monomer having a SP value that falls within the range include acryloylmorpholine, hydroxyethyl (meth)acrylate, lauryl acrylate, laurylmethyl acrylate, isobornyl methacrylate, isobornyl acrylate, diethylene glycol mono-2-ethylhexyl ether acrylate, cyclohexyl acrylate, tetrahydrofurfuryl methacrylate, benzyl methacrylate, diethylene glycol monophenyl ether acrylate, and tetraethylene glycol monophenyl ether acrylate. The SP value is a solubility parameter calculated from the Small's equation. The SP value can be calculated by a method disclosed in a known literature (such as Journal of Applied Chemistry, 3, 71, 1953.).

The content of the curable monomer having a SP value of from 7 to 13 $(cal/cm^3)^{1/2}$ (preferably from 8 to 12 $(cal/cm^3)^{1/2}$) in the adhesive is preferably 20 wt % or more, more preferably 25 wt % or more, still more preferably from 25 wt % to 50 wt % with respect to the total amount of the monomers in the adhesive.

The adhesive layer can be formed by, for example, applying a composition for forming an adhesive layer containing the curable monomer onto the resin film, and then curing the applied layer. In practical use, the applied layer is preferably cured after an adherend (e.g., the optical functional layer) has been arranged on the applied layer. Details are described later.

D. Optical Functional Layer

As described above, the optical laminate of the present invention may include any appropriate optical functional layer on the side of the adhesive layer opposite to the resin layer.

In one embodiment, the optical functional layer of the optical laminate of the present invention is a solidified layer or cured layer of a liquid crystal material. The term "solidified layer" as used herein refers to a layer obtained by cooling the liquid crystal material in a softened, molten, or solution state to bring the material into a solidified state. In addition, the term "cured layer" refers to a layer obtained by cross-linking the liquid crystal material with heat, a catalyst, light, and/or a radiation to bring the material into such a stable state that the material neither dissolves nor melts, or hardly dissolves and hardly melts. It should be noted that the cured layer includes a cured layer obtained via the solidified layer of the liquid crystal material.

The solidified layer or cured layer of the liquid crystal material is specifically, for example, a film formed from a liquid crystal material fixed (solidified or cured) in homeotropic alignment (homeotropic alignment liquid crystal film). The use of such film can provide the following optical laminate: in the case where the laminate is used in an image display apparatus, the laminate can contribute to an improvement in tint when the apparatus is viewed from an oblique direction and an improvement in antireflection characteristic. The term "homeotropic alignment" as used herein refers to an alignment state in which the long axis direction of the liquid crystal material (liquid crystal compound) is at an angle of 90°±30° relative to each of the front and rear surfaces of the optical functional layer. In other words, the "homeotropic alignment" includes not only pure vertical alignment but also predetermined tilt alignment. It should be noted that the tilt angle of the tilt alignment can be determined in accordance with, for example, a procedure disclosed in Journal of Applied Physics, Vol. 38 (1999), P. 748. Such film can have a refractive index profile of $nz>nx=ny$, and hence can function as the so-called positive C-plate. The expression "$nx=ny$" as used herein includes not only the case where the nx and the ny are strictly identical to each other but also the case where the nx and the ny are substantially equal to each other. That is, the expression means that the Re is less than 10 nm. The film has a thickness direction retardation Rth of preferably from −20 nm to −200 nm, more preferably from −40 nm to −180 nm, particularly preferably from −40 nm to −160 nm. The thickness of the film capable of providing such Rth may vary in accordance with a material to be used and the like. The thickness is preferably from 0.5 μm to 60 μm, more preferably from 0.5 μm to 50 μm, most preferably from 0.5 μm to 40 μm.

The liquid crystal material (liquid crystal compound) capable of forming the homeotropic alignment may be a liquid crystal monomer, or may be a liquid crystal polymer. A typical liquid crystal compound is, for example, a nematic liquid crystal compound. General information about an alignment technology for such liquid crystal compound is disclosed in, for example, Chemistry Review 44 (Surface Modification, edited by The Chemical Society of Japan, p. 156-163).

A film containing the liquid crystal material fixed in homeotropic alignment is disclosed in, for example, Japanese Patent Application Laid-open No. 2008-216782 in detail. The entire disclosure of the publication is incorporated herein by reference.

The film containing the liquid crystal material fixed in homeotropic alignment is formed by: applying a liquid crystalline composition containing the liquid crystal material (liquid crystal compound) onto a base material; homeotropically aligning the composition under a state in which the composition shows a liquid crystal phase; and fixing the composition under a state in which the alignment is maintained.

The optical laminate of the invention of the subject application is excellent in adhesiveness between the resin layer and the adhesive layer, and hence the peelability of a base material upon transfer of a film formed on the base material onto the adhesive layer is excellent (specifically, only the base material can satisfactorily peel). From such viewpoint, the homeotropic alignment liquid crystal film is suitable as a film constituting the optical functional layer of the optical laminate. A constituent material for the base material is, for example, a film formed of a norbornene-based resin, a polycarbonate-based resin, a cellulose-based resin, a (meth)acrylic resin, a polyester-based resin, a nylon-based resin, a polyolefin-based resin, such as polypropylene, a vinyl-based resin, a maleic acid-based resin, a phthalic acid-based resin, or the like. The film may be a stretched film. An alignment film may be formed on the surface of the base material. The base material with the alignment film can be obtained by, for example, applying an application solution containing a silane coupling agent and a silica sol onto the base material, and removing the solvent through drying.

E. Polarizer and Protective Layer

As described above, the optical laminate of the present invention can include the polarizer. For example, a circularly polarizing plate can be obtained by constituting the optical laminate through the combination of the polarizer and the resin layer capable of functioning as a λ/4 plate described in the section B. Further, a circularly polarizing plate that excels at improving a tint when viewed from an oblique direction and improving an antireflection characteristic can be obtained by constituting the optical laminate through the combination of the polarizer, the resin layer capable of functioning as a λ/4 plate described in the section B, and the optical functional layer formed from the homeotropic alignment liquid crystal film described in the section D.

Any appropriate polarizer may be adopted as the polarizer. For example, a resin film forming the polarizer may be a single-layer resin film, or may be a laminate of two or more layers.

A polarizer including a single-layer resin film is specifically, for example: a product obtained by subjecting a hydrophilic polymer film, such as a polyvinyl alcohol (PVA)-based resin film, a partially formalized PVA-based resin film, or an ethylene-vinyl acetate copolymer-based partially saponified film to dyeing treatment with a dichromatic substance, such as iodine or a dichromatic dye, and stretching treatment; or a polyene-based alignment film, such as a dehydration-treated product of PVA or a dehydrochlorination-treated product of polyvinyl chloride. Of those, a polarizer obtained by dyeing a PVA-based resin film with iodine and uniaxially stretching the film is preferably used because of its excellent optical characteristics.

The dyeing with iodine is performed by, for example, immersing the PVA-based resin film in an aqueous solution of iodine. The stretching ratio of the uniaxial stretching is preferably from 3 times to 7 times. The stretching may be performed after the dyeing treatment or may be performed simultaneously with the dyeing. In addition, the stretching may be performed before the dyeing. The PVA-based resin film is subjected to, for example, swelling treatment, cross-linking treatment, washing treatment, or drying treatment as required. For example, when the PVA-based resin film is washed with water by being immersed in water before the dyeing, the soil or antiblocking agent on the surface of the PVA-based resin film can be washed off. In addition, the PVA-based resin film can be swollen to prevent dyeing unevenness or the like.

The polarizer obtained by using the laminate is specifically, for example, a polarizer obtained by using a laminate of a resin base material and a PVA-based resin layer (PVA-based resin film) laminated on the resin base material, or a laminate of a resin base material and a PVA-based resin layer formed on the resin base material through application. The polarizer obtained by using the laminate of the resin base material and the PVA-based resin layer formed on the resin base material through application can be produced by, for example, a method involving: applying a PVA-based resin solution to the resin base material; drying the solution to form the PVA-based resin layer on the resin base material, there by providing the laminate of the resin base material and the PVA-based resin layer; and stretching and dyeing the laminate to turn the PVA-based resin layer into the polarizer. In this embodiment, the stretching typically includes the stretching of the laminate under a state in which the laminate is immersed in an aqueous solution of boric acid. The stretching may further include the aerial stretching of the laminate at high temperature (e.g., 95° C. or more) before the stretching in the aqueous solution of boric acid as required. The resultant laminate of the resin base material and the polarizer may be used as it is (i.e., the resin base material may be used as a protective layer for the polarizer). Alternatively, a product obtained as described below may be used: the resin base material is peeled from the laminate of the resin base material and the polarizer, and any appropriate protective layer in accordance with a purpose is laminated on the peeling surface. Such method of producing a polarizer is disclosed in, for example, Japanese Patent Application Laid-open No. 2012-73580 in detail. The entire disclosure of the publication is incorporated herein by reference.

The thickness of the polarizer is preferably 15 μm or less, more preferably 13 μm or less, still more preferably 10 μm or less, particularly preferably 8 μm or less. A lower limit for the thickness of the polarizer is 2 μm in one embodiment, and is 3 μm in another embodiment.

The polarizer preferably shows absorption dichroism at any wavelength in the wavelength range of from 380 nm to 780 nm. The single axis transmittance of the polarizer is preferably from 44.0% to 45.5%, more preferably from 44.5% to 45.0%.

The polarization degree of the polarizer is preferably 98% or more, more preferably 98.5% or more, still more preferably 99% or more.

The protective layer can be arranged on one side, or each of both sides, of the polarizer. The resin layer may also serve as the protective layer (inner protective layer) to be arranged on the inner side of the polarizer as described above, or the protective layer may be a layer different from the resin layer (protective layer arranged between the resin layer and the polarizer). The inner protective layer to be arranged separately from the resin layer and the protective layer to be arranged on the outer side of the polarizer are each formed of any appropriate film. A material serving as a main component of the film is specifically, for example: a cellulose-based resin, such as triacetylcellulose (TAC); a transparent resin, such as a polyester-based, polyvinyl alcohol-based, polycarbonate-based, polyamide-based, polyimide-based, polyether sulfone-based, polysulfone-based, polystyrene-based, polynorbornene-based, polyolefin-based, (meth)acrylic, or acetate-based transparent resin; or a thermosetting resin or a UV-curable resin, such as a (meth) acrylic, urethane-based, (meth)acrylic urethane-based, epoxy-based, or silicone-based thermosetting resin or UV-curable resin. In addition, examples thereof also include a glassy polymer, such as a siloxane-based polymer. In addition, a polymer film disclosed in Japanese Patent Application Laid-open No. 2001-343529 (International Patent WO01/37007A) may also be used. For example, a resin composition containing a thermoplastic resin having a substituted or unsubstituted imide group on a side chain thereof, and a thermoplastic resin having a substituted or unsubstituted phenyl group and a nitrile group on side chains thereof can be used as the material for the film, and the composition is, for example, a resin composition having an alternating copolymer formed of isobutene and N-methylmaleimide, and an acrylonitrile-styrene copolymer. The polymer film can be, for example, an extrudate of the resin composition.

F. Method of Producing Optical Laminate

The optical laminate of the present invention can be formed by, for example, applying a composition for forming an adhesive layer onto such resin film as described in the section B. When an adhesive layer including a curable adhesive is formed, the adhesive layer is formed by applying the composition for forming an adhesive layer and then curing the applied layer. When the optical laminate includes the optical functional layer, it is preferred that the film constituting the optical functional layer (e.g., the film containing the liquid crystal material fixed in homeotropic alignment) be laminated on the applied layer of the composition for forming an adhesive layer, and then the applied layer be cured.

The composition for forming an adhesive layer contains the adhesive described in the section C. In addition, the composition for forming an adhesive layer may contain any appropriate solvent and/or additive as required. Examples of the additive include an initiator, a cross-linking agent, a tackifier, a plasticizer, a pigment, a dye, a filler, an age resistor, a conductive material, an antistatic agent, a UV absorber, a light stabilizer, a release modifier, a softener, a surfactant, a flame retardant, and an antioxidant.

Any appropriate application means may be used for the application. Preferred examples thereof include a wire bar, a curtain coater, a roll coater, and a gravure coater. An applied layer may be formed by applying the composition for forming an adhesive layer and then drying the composition. The drying temperature thereof is, for example, from 40° C. to 160° C. The drying time thereof is, for example, from 30 seconds to 1 hour.

Any appropriate method may be adopted as a method of curing the applied layer in accordance with an adhesive in the composition for forming an adhesive layer. When a UV-curable adhesive is used, the applied layer is cured by being irradiated with UV light. The dose of the UV light is preferably from 200 mJ/cm$^2$ to 2,000 mJ/cm$^2$, more preferably from 400 mJ/cm$^2$ to 1,500 mJ/cm$^2$.

In one embodiment, after a predetermined time period has elapsed from the end of the formation of the applied layer of the composition for forming an adhesive layer, the applied layer is cured. The thickness of the intermediate layer can be adjusted by controlling a time period from the end of the formation of the applied layer to the initiation of curing treatment. As the time period becomes longer, the thickness of the intermediate layer can be increased. The time period from the end of the formation of the applied layer to the initiation of the curing treatment, which can be appropriately controlled in accordance with, for example, the composition of the composition for forming an adhesive layer and the kind of the resin film constituting the resin layer, is preferably from 10 seconds to 250 seconds, more preferably from 20 seconds to 200 seconds, still more preferably from 30 seconds to 180 seconds.

When the optical laminate includes the optical functional layer, the optical functional layer can be typically formed by transfer. More specifically, a method of producing the optical laminate including the optical functional layer includes, for example, the steps of: (i) producing a laminate a including a base material and the film constituting the optical functional layer formed on the base material (e.g., the film containing the liquid crystal material fixed in homeotropic alignment); (ii) forming the applied layer of the composition for forming an adhesive layer on the resin film constituting the resin layer to provide a laminate b; (iii) bonding the film surface of the laminate a and the applied layer surface of the laminate b; (iv) curing the applied layer to form the adhesive layer; and (v) peeling the base material after the formation. When the optical laminate is produced by such production method, the time period from the end of the formation of the applied layer to the initiation of the curing treatment is a time period from the end of the step (ii) to the initiation of the step (iv). It should be noted that the applied layer of the composition for forming an adhesive layer may be formed on the film constituting the optical functional layer of the laminate a as well.

In the laminate a, the peel strength of the base material with respect to the optical functional layer is preferably smaller than the peel strength of the resin layer with respect to the adhesive layer. The peel strength of the base material with respect to the optical functional layer is preferably 90% or less, more preferably from 50% to 85%, still more preferably from 60% to 80% of the peel strength of the resin layer with respect to the adhesive layer. When the peel strength falls within such range, the adhesive layer is prevented from being detached from the resin layer upon peeling of the base material, and hence only the base material can be satisfactorily peeled.

When the optical laminate includes the polarizer, the polarizer may be bonded onto the resin layer through any appropriate adhesive or pressure-sensitive adhesive.

Now, the present invention is specifically described by way of Examples. However, the present invention is not limited by these Examples.

Production Example 1

Production of Laminate a

A solution of ethyl silicate in the mixture of isopropyl alcohol and butanol (manufactured by Colcoat Co., Ltd., trade name: "Colcoat P", solid content: 2 wt %) was applied onto a polyethylene terephthalate (PET) film having a surface subjected to corona treatment, and the solution was heated at 130° C. for 1 minute. Thus, a base material (with an alignment film) was obtained.

A liquid crystal application liquid was prepared by dissolving 5 parts by weight of a side chain-type liquid crystal polymer represented by the following chemical formula (I) (numbers 65 and 35 in the formula each represented the mol % of a monomer unit, and the polymer was represented as a block polymer body for convenience: weight-average molecular weight: 5,000), 20 parts by weight of a polymerizable liquid crystal showing a nematic liquid crystal phase (manufactured by BASF, trade name: "Paliocolor LC242"), and 5 parts by weight of a photopolymerization initiator (manufactured by Ciba Specialty Chemicals Inc.: trade name: "IRGACURE 907") in 75 parts by weight of cyclohexanone. Then, the application liquid was applied onto the base material obtained in the foregoing with a bar coater, and then the liquid crystal was aligned by heating and drying the liquid at 80° C. for 2 minutes. After that, the resultant was cooled to room temperature in one stroke and the liquid crystal layer was cured by being irradiated with UV light. Thus, a laminate a having a homeotropic alignment liquid crystal film (optical functional layer; thickness: 2.5 μm) formed on the base material was obtained.

Production Example 2

Preparation of Composition for Forming Adhesive Layer

62 Parts by weight of hydroxyethyl acrylamide (manufactured by Kohjin Co., Ltd., trade name: "HEAA"), 25 parts by weight of acryloyl morpholine (manufactured by Kohjin Co., Ltd., trade name: "ACMO"), 7 parts by weight of PEG 400# diacrylate (manufactured by Kyoeisha Chemical Co., Ltd., trade name: "LIGHT ACRYLATE 9EG-A"), 3 parts by weight of a product available under the trade name "IRGACURE 907" from BASF, and 3 parts by weight of a product available under the trade name "KAYACURE DETX-S" from Nippon Kayaku Co., Ltd. were mixed for 60 minutes to prepare a composition for forming an adhesive layer.

Example 1

A stretched film (thickness: 50 μm) of a polycarbonate-based resin film containing a constituent unit derived from isosorbide (37.1 mol %), a constituent unit derived from 9,9-bis[4-(2-hydroxyethoxy)phenyl]fluorene (47.4 mol %), and a constituent unit derived from 1,4-cyclohexanedimethanol (15.5 mol %) was obtained in conformity with a method described in Example 1 of Japanese Patent No. 5204200.

The composition for forming an adhesive layer obtained in Production Example 2 was applied onto the resultant stretched film to form an applied layer I.

In addition, the surface of the homeotropic alignment liquid crystal film (optical functional layer) of the laminate a obtained in Production Example 1 was subjected to corona treatment, and then the composition for forming an adhesive layer was applied to the treated surface to form an applied layer II.

The applied layer I on the stretched film and the applied layer II of the laminate a were bonded to each other. Next, after a lapse of 10 seconds from the application of the composition for forming an adhesive layer to the stretched film, the applied layer was irradiated with UV light (dose: 700 mJ/cm$^2$) by using a UV curing apparatus (V BULB) manufactured by Fusion UV Systems Inc. Thus, an optical laminate with a base material was obtained.

Example 2

An optical laminate with a base material was obtained in the same manner as in Example 1 except that UV irradiation was performed 30 seconds after the application of the composition for forming an adhesive layer to the stretched film.

Example 3

An optical laminate with a base material was obtained in the same manner as in Example 1 except that UV irradiation was performed 45 seconds after the application of the composition for forming an adhesive layer to the stretched film.

Example 4

An optical laminate with a base material was obtained in the same manner as in Example 1 except that UV irradiation was performed 60 seconds after the application of the composition for forming an adhesive layer to the stretched film.

Example 5

An optical laminate with a base material was obtained in the same manner as in Example 1 except that UV irradiation was performed 180 seconds after the application of the composition for forming an adhesive layer to the stretched film.

Example 6

An optical laminate with a base material was obtained in the same manner as in Example 1 except that: ARTON FILM manufactured by JSR Corporation (trade name, cycloolefin-based resin film, thickness: 40 μm) was used instead of the stretched film of the polycarbonate-based resin film; and UV irradiation was performed 45 seconds after the application of the composition for forming an adhesive layer to the ARTON FILM.

Comparative Example 1

An optical laminate with a base material was obtained in the same manner as in Example 1 except that UV irradiation was performed 5 seconds after the application of the composition for forming an adhesive layer to the stretched film.

Comparative Example 2

An optical laminate with a base material was obtained in the same manner as in Example 1 except that UV irradiation was performed 300 seconds after the application of the composition for forming an adhesive layer to the stretched film.

<Evaluations>

The optical laminates obtained in Examples and Comparative Examples were subjected to the following evaluations. The results are shown in Table 1.

(1) Transfer Base Material Peelability

The base material side of each of the resultant optical laminates with base materials was directed upward, and the base material was peeled in a 180° direction. The case where only the base material was peeled after the peeling was evaluated as being acceptable (o in Table 1). The case where an optical functional layer component or an adhesive layer component adhered to the base material was evaluated as being unacceptable (x in Table 1).

(2) Peel Strength

After the base material had been peeled from each of the resultant optical laminates with base materials, a polyimide tape was bonded to the outer side of the resin layer of the optical laminate to perform reinforcement. Thus, a measurement sample (having a width of 25 mm) was prepared. The peel strength of the resin layer with respect to the adhesive layer was measured with a variable angle peel tester (measurement temperature: 23° C., tension speed: 3,000 mm/min, tensile direction: 90°).

(3) Thicknesses of Intermediate Layer and Adhesive Layer

A section of each of the optical laminates was observed with a TEM, and the thicknesses of the intermediate layer and the adhesive layer were measured.

TABLE 1

| | Resin layer | Time period from end of application of composition for forming adhesive layer to initiation of UV irradiation (second(s)) | Thickness of intermediate layer (nm) | Thickness of adhesive layer (nm) | Peel strength (N/25 mm) | Transfer base material peelability |
|---|---|---|---|---|---|---|
| Example 1 | PC film | 10 | 20 | 980 | 10 | o |
| Example 2 | PC film | 30 | 30 | 975 | 10 | o |
| Example 3 | PC film | 45 | 50 | 960 | 10 | o |
| Example 4 | PC film | 60 | 100 | 925 | 10 | o |
| Example 5 | PC film | 180 | 200 | 790 | 10 | o |
| Example 6 | Cycloolefin film | 45 | 40 | 950 | 7.3 | o |
| Comparative Example 1 | PC film | 5 | 10 | 990 | 5 | x |

TABLE 1-continued

| | Resin layer | Time period from end of application of composition for forming adhesive layer to initiation of UV irradiation (second(s)) | Thickness of intermediate layer (nm) | Thickness of adhesive layer (nm) | Peel strength (N/25 mm) | Transfer base material peelability |
|---|---|---|---|---|---|---|
| Comparative Example 2 | PC film | 300 | 300 | 720 | — | x |

As is apparent from Table 1, the optical laminate of the present invention is excellent in adhesiveness between the resin layer and the adhesive layer because the intermediate layer having a specific thickness is formed between the resin layer and the adhesive layer. It should be noted that when the thickness of the intermediate layer was excessively large (Comparative Example 2), a cohesive failure occurred in the adhesive layer at a load of 5 N upon measurement of (2) the peel strength.

The polarizing plate with a retardation layer of the present invention is suitably used in an image display apparatus, such as a liquid crystal display apparatus or an organic EL display apparatus.

What is claimed is:

1. An optical laminate, comprising:
a resin layer;
an adhesive layer arranged on at least one side of the resin layer; and
an intermediate layer formed between the resin layer and the adhesive layer, the intermediate layer containing at least part of a material constituting the resin layer and at least part of a material constituting the adhesive layer,
wherein the resin layer is formed from a cycloolefin-based resin film or a polycarbonate-based resin film,
wherein the adhesive layer has a thickness of from 0.5 μm to 2 μm,
wherein the intermediate layer has a thickness of from 20 nm to 200 nm, and
wherein the thickness of the intermediate layer is from 2% to 10.8% of the thickness of the adhesive layer.

2. The optical laminate according to claim 1, wherein the resin layer includes a resin film having optical anisotropy.

3. The optical laminate according to claim 1, further comprising an optical functional layer arranged on a side of the adhesive layer opposite to the resin layer, wherein the optical functional layer comprises one of a solidified layer of a liquid crystal material and a cured layer thereof.

4. The optical laminate according to claim 3, wherein the optical functional layer is formed by transfer.

5. A circularly polarizing plate, comprising the optical laminate of claim 1.

6. A method of producing the optical laminate of claim 1, the method comprising:
applying a composition for forming an adhesive layer containing a curable adhesive onto a resin film to form an applied layer; and
curing the applied layer,
a time period from an end of the formation of the applied layer to initiation of curing treatment being from 10 seconds to 250 seconds.

* * * * *